US010546557B2

(12) United States Patent
Jain et al.

(10) Patent No.: US 10,546,557 B2
(45) Date of Patent: Jan. 28, 2020

(54) REMOVING OVERLAYS FROM A SCREEN TO SEPARATELY RECORD SCREENS AND OVERLAYS IN A DIGITAL MEDIUM ENVIRONMENT

(71) Applicant: Adobe Inc., San Jose, CA (US)

(72) Inventors: Siddhant Jain, Bangalore (IN); Renzil Leith DSouza, Bangalore (IN)

(73) Assignee: Adobe Inc., San Jose, CA (US)

(*) Notice: Subject to any disclaimer, the term of this patent is extended or adjusted under 35 U.S.C. 154(b) by 46 days.

(21) Appl. No.: 15/380,414

(22) Filed: Dec. 15, 2016

(65) Prior Publication Data

US 2018/0137835 A1    May 17, 2018

Related U.S. Application Data

(60) Provisional application No. 62/421,912, filed on Nov. 14, 2016.

(51) Int. Cl.
*G09G 5/14* (2006.01)
(52) U.S. Cl.
CPC ..................... *G09G 5/14* (2013.01)
(58) Field of Classification Search
CPC .................. G09G 5/026; G06T 1/20
See application file for complete search history.

(56) References Cited

U.S. PATENT DOCUMENTS

| | | | | |
|---|---|---|---|---|
| 2009/0262122 A1* | 10/2009 | Darsa | ....................... | G09G 5/14 345/545 |
| 2011/0271185 A1* | 11/2011 | Chen | ....................... | G06F 9/453 715/708 |
| 2014/0169666 A1* | 6/2014 | Hong | ..................... | G06T 15/503 382/162 |
| 2016/0093242 A1* | 3/2016 | Kim | ...................... | G09G 3/2003 345/589 |

* cited by examiner

*Primary Examiner* — Sarah Lhymn
(74) *Attorney, Agent, or Firm* — SBMC

(57) ABSTRACT

Overlay and screen recording techniques are described that enables separate recordings of a screen and one or more overlays that were displayed on the screen during recording. In one example, pixel values of an overlay are blended with pixel values of a screen to paint the overlay onto the screen in a transparent manner that is imperceptible to the human eye but allows for original screen pixel values to be recovered from areas of the screen that were visually occluded by the overlay. This enables a user to display recording controls and visual cues on their screen without having to worry about the overlay visually occluding any screen content during the recording. One or both of the separately recorded screen and overlay streams can then be output for playback to enable viewing of the individual streams without loss in quality or content of the individual streams.

20 Claims, 7 Drawing Sheets

REMOVING OVERLAYS FROM A SCREEN TO SEPARATELY RECORD SCREENS AND OVERLAYS IN A DIGITAL MEDIUM ENVIRONMENT

RELATED APPLICATIONS

This Application claims priority to U.S. Provisional Patent Application No. 62/421,912, filed Nov. 14, 2016, and titled "Removing Overlays from a Screen to Separately Record Screens and Overlays in a Digital Medium Environment," the disclosure of which is incorporated by reference in its entirety.

BACKGROUND

In digital medium environments, users often wish to share digital content displayed on a screen with other users or record the digital content for future viewing. For example, in the context of an online conference, a user presenting a slideshow presentation with an accompanying webcam stream may wish to record both the slideshow presentation and webcam stream so that users who were unable to attend the online conference may view the material. The presenting user may choose to use screen overlays that are visually displayed at their own computing device but are not visible by other users in the online conference. For example, the presenting user might implement a teleprompter stream to prompt a script to follow during the online conference, a preview of the user's webcam stream if the user is recording himself or herself with a webcam, a time bar to indicate the elapsed time of the presentation, and so on. Although these screen overlays are useful to a presenting user during the presentation and recording of the presenting user's screen, the overlays are unhelpful and often distracting to other users that are viewing the presenting user's screen during a live online conference or during a recording of the online conference.

Because the overlays are part of presenting the user's screen during recording, the overlays become part of the output that is viewed by other users who are viewing the presenting user's screen or viewing a recorded version of the presenting user's screen. Because these overlays are often distracting and unhelpful to users other than the presenting user, conventional techniques visually obscure portions of the screen occupied by visual overlays, such that other users are unable to see portions of the presenting user's screen occupied by an overlay. These conventional techniques are often problematic for visually obscuring portions of the screen occupied by overlays, rendering a viewing user unable to view any digital content otherwise located in portions of the screen occupied by overlays. For example, conventional techniques visually obscure portions of the screen occupied by overlays with opaque boxes. This visual obscuring leaves other users unable to view the presentation as intended by the presenting user and often blocks display of important digital content.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

Screen recording techniques are described herein. In one example, an overlay is received for display as part of a screen. The overlay may include a display of content that is designed to make screen recording easier for a user without interfering with the screen recording itself. For example, the overlay may include controls and content that are displayed on the screen during recording, but that are not intended to be recorded along with the screen. The overlay is processed to improve its display characteristics during display on a screen and subsequent playback by a media player, and recorded for future retrieval and playback.

The screen on which the overlay is to be displayed is then received. The overlay is then painted onto the screen by combining a screen pixel value with an overlay pixel value for each pixel covered by the overlay. In an implementation, each pixel of the overlay that is painted onto the screen is determined to have a mathematically weighted combination of the pixel value of the screen and an original pixel value of the overlay. In some instances, weights are defined by alpha values that can vary in value between 0 and 1 and represent a degree of transparency for the overlay when painted onto the screen. In this manner, the overlay is painted onto the screen with a degree of transparency. The degree of transparency is imperceptible to the human eye, but enables original screen pixel values to be recovered, thereby preserving displayed content of the screen that is otherwise visually occluded by an overlay. The overlays are then decomposed from the screen during display to record the screen independent of any painted overlays. In an implementation, decomposing the overlay from the screen refers to determining original screen pixel values from the mathematically weighted combination of overlay pixel values and screen pixel values that were used to paint the overlay with a degree of transparency onto the screen. Because original screen pixel values are preserved in the mathematically weighted combination of pixel values used to paint the overlay onto the screen, the original screen pixel values can be determined even for areas of the screen that are covered by a painted overlay. Original screen pixel values can be determined from the weighted combination of pixel values using original overlay pixel values, mathematically weighted pixel values used to paint the overlay onto the screen, and the alpha value used to generate the mathematically waited pixel values. The recorded screen is then stored in a format that is configured for subsequent playback by a media player. Thus, the techniques described herein enable a screen with overlays that were simultaneously displayed to be separately viewed and played back in a manner that preserves any content displayed by either the screen or overlay.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
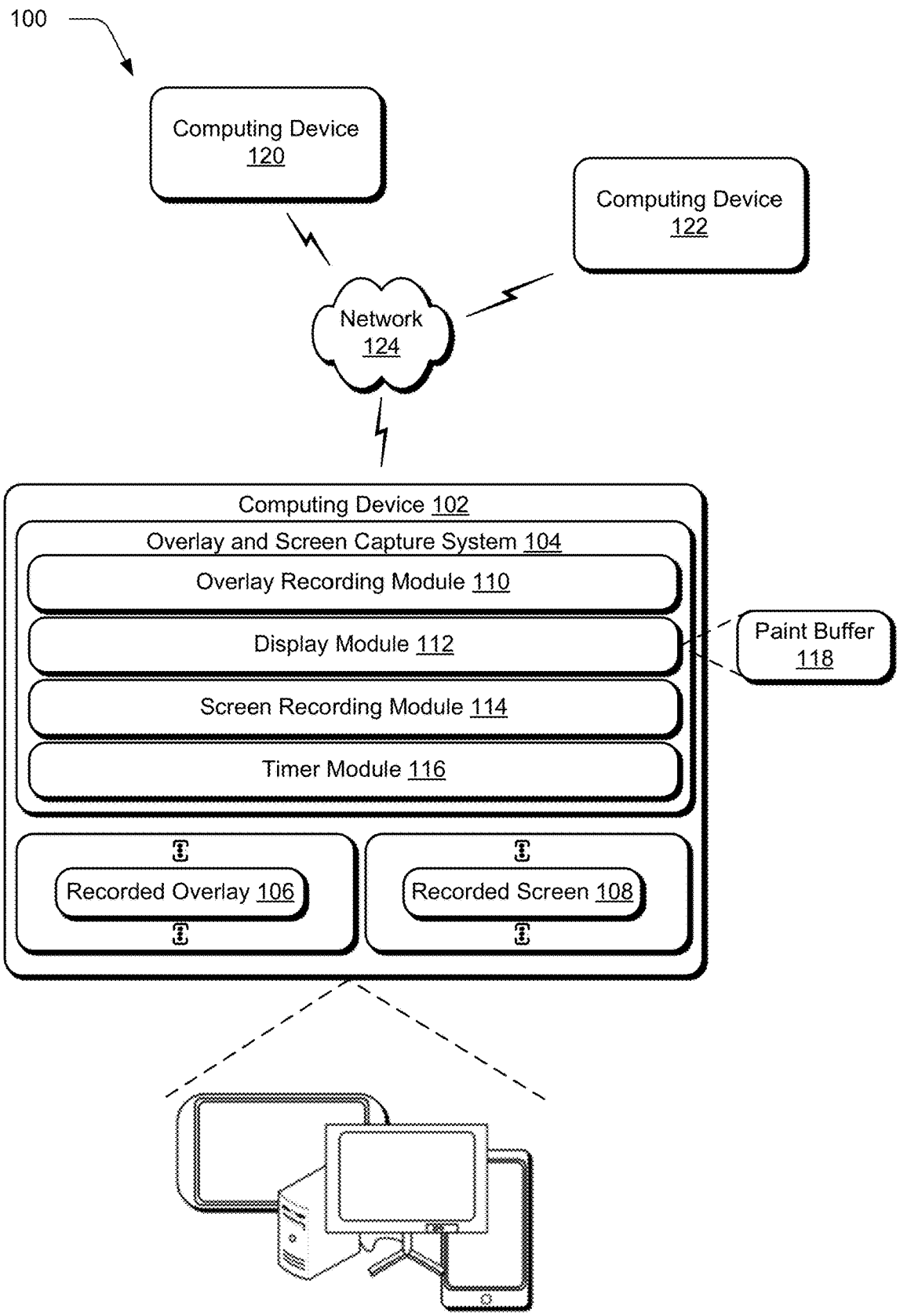
FIG. 1 is an illustration of an environment in an example implementation that is operable to employ techniques described herein.

Users often wish to record their screens for sharing with others or for future viewing. For example, screen recording is often used in online conferencing scenarios to share a screen with users that are geographically spread out over the world and to enable users that are unable to attend the live online conference to watch a recording of the conference at a later time. As discussed herein, a "screen" refers to a display of user interfaces and/or digital content within a display area of a computing device that a user of the computing device intends to record or share with others. When recording a screen, a user might wish to use overlays that are visually displayed on the screen of their own computing device, but are not intended to be seen by other users. As discussed herein, an "overlay" refers to a display of content that visually occludes at least a portion of a screen but is not intended to be recorded with the screen. For example, an overlay may include one or a combination of chrome of the online conference service, controls for starting or stopping screen sharing in the online conference service, a teleprompter display, a webcam preview, a time bar, and the like. Alternatively or additionally, an overlay may include a display of content generated by an application on a presenting user's computing device that is not in focus during an online conference. For example, an overlay may include a notification generated by an email application that is out of focus during an online conference. Thus, as discussed herein, an overlay refers to a display of content that a presenting user does not intend to share with different users. Content may include various combinations of video, audio, multi-media streams, games, animations, images, web documents, web pages, applications, device applications, and the like.

For example, a presenting user in an online conference might implement a teleprompter stream to prompt a script to follow during the online conference, a preview of the user's webcam stream if the user is recording himself or herself with a webcam, a time bar to indicate the elapsed time of the presentation, and so on. Furthermore, the presenting user may implement overlays that include interactive elements like buttons to stop and start the screen recording, in order to facilitate the online presentation. Although these overlays are helpful to the presenting user, they are often unhelpful to other attendees of the online conference and in many cases can visually obscure important portions of the screen that are intended for sharing and recording. However, because overlays were displayed on the presenting user's screen during recording, the overlays become a part of the recorded and shared output of the screen.

The screen recording techniques discussed herein generate separately recorded overlays and screens in a manner that allows for separate playback of the screen and overlays without portions of the screen being visually obscured by an overlay. In accordance with one or more implementations, overlays that are configured for display as part of a screen are received and recorded before being painted onto the screen. The overlay is stored as an image having one or more pixels with associated pixel values describing a color and a brightness for each pixel of the overlay. When the overlays are received, the overlays are optionally processed to improve display characteristics of the overlay during display on a screen and during subsequent playback by a media player. The overlays are also associated with location information describing corresponding pixels of the screen that are to be overlapped by the overlays.

Using the location information, screen pixel values are determined for the screen pixels that are to be overlapped by the overlays. The screen pixel values and overlay pixel values are blended together to provide the overlays with a degree of transparency before being painted onto the screen. As discussed herein, each pixel of an overlay is blended with a corresponding pixel of the screen to produce a mathematically weighted combination of the overlay pixel value and the screen pixel value to be used in painting the overlay onto the screen. Weights of the respective overlay and screen pixel values to use in the mathematically weighted combination of pixel values are defined by alpha values that can vary in value between 0 and 1 and represent a degree of transparency for the overlay when painted onto the screen. Although this degree of transparency is not discernable by the human eye, the degree of transparency enables the overlays to be decomposed from the screen to retrieve original screen pixel values using the techniques described herein. Using the blended pixel values, the overlays are painted onto the screen for display. The screen can then be recorded without including the overlays in the recording by decomposing the overlays from the screen to retrieve original screen pixel values. As discussed herein, decomposing a painted overlay from a screen refers to determining original screen pixel values from the mathematically weighted combination of overlay pixel values and screen pixel values used to blend the painted overlay with the screen. Because information describing original screen pixel values for a pixel occupied by a painted overlay is preserved in the mathematically weighted combination of pixel values used in painting the overlay onto the screen, original screen pixel values can be retrieved from pixels occupied by a painted overlay. In an implementation, an original screen pixel value is determined by subtracting the weighted original overlay pixel value from the mathematically weighted combination of pixel values and dividing the resulting by the alpha value used to blend the screen and overlay pixel values. This is repeated for each screen pixel occupied by a painted overlay to determine original screen pixel values for the entire screen. The original screen pixel values are then used to generate a recorded screen independent of any overlay.

By decomposing the overlays from the screen while recording the screen, the techniques described herein enable a user to record their screen with multiple overlays without having to worry about screen content being hidden or lost during recording. In contrast to the techniques described herein, conventional approaches only use original overlay pixel values when displaying an overlay on a screen, thereby preventing retrieval of any underlying screen pixel values after an overlay is added to the screen. The techniques described herein are thus advantageous over conventional techniques by enabling separate recording and playback of the screen and any displayed overlays, allowing a presenting user to choose what information is shared with others. Furthermore, the techniques described herein enable a user to simultaneously display multiple overlays during a screen recording that visually obscure a portion or an entirety of the screen without having to worry about being able to retrieve pixel values for the obscured portions of the screen.

Recording a screen using the techniques described herein is additionally advantageous in that it removes any artifact from a screen that otherwise might be caused by a displayed overlay. For example, conventional techniques often cover screen pixels occupied by an overlay during recording with artifacts such as gray, black, or otherwise opaque pixel values to hide the overlay that was visible during recording. However, these artifacts also block viewing or retrieval of any underlying screen pixel values, and thus fail to provide the benefits of the techniques described herein. Accordingly, users can efficiently record screens with the use of overlays in a manner that preserves displayed content and prevents any content from being included in a recording that was not intended to be recorded, which increases user privacy when recording a screen from a personal computer. Further discussion of these and other examples is included below.

In the following discussion, an example digital medium environment is first described that can employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a computing device 102 having a processing system that may include one or more processing devices (e.g., processors) and one or more computer-readable storage media, as further described in relation to FIG. 7.

The computing device 102 may be configured as any suitable type of computing device. For example, the computing device may be configured as a desktop computer, a laptop computer, a mobile device (e.g., assuming a handheld configuration such as a tablet or mobile phone), a tablet, a camera, a wearable device (e.g., assuming a configuration that can be worn by a user such as a watch or glasses), and so forth. Thus, the computing device 102 may range from full resource devices with substantial memory and processor resources (e.g., personal computers, game consoles) to a low-resource device with limited memory and/or processing resources (e.g., mobile and wearable devices). Additionally, although a single computing device 102 is shown, the computing device 102 may be representative of a plurality of different devices to perform operations "over the cloud" as further described in relation to FIG. 7.

The computing device 102 is illustrated as including an overlay and screen capture system 104. The overlay and screen capture system 104 is representative of logic implemented at least partially in hardware to generate a recorded overlay 106 and a recorded screen 108 from a screen that includes a display of one or more overlays. For example, the logic of the overlay and screen capture system 104 may comprise computer-executable instructions that are stored on computer-readable storage media and executable by the processing system, as further described in relation to FIG. 7. As described in further detail below, the recorded overlay 106 and the recorded screen 108 are representative of screens and overlays that have been captured and recorded by the overlay and screen capture system 104.

Figure 7:
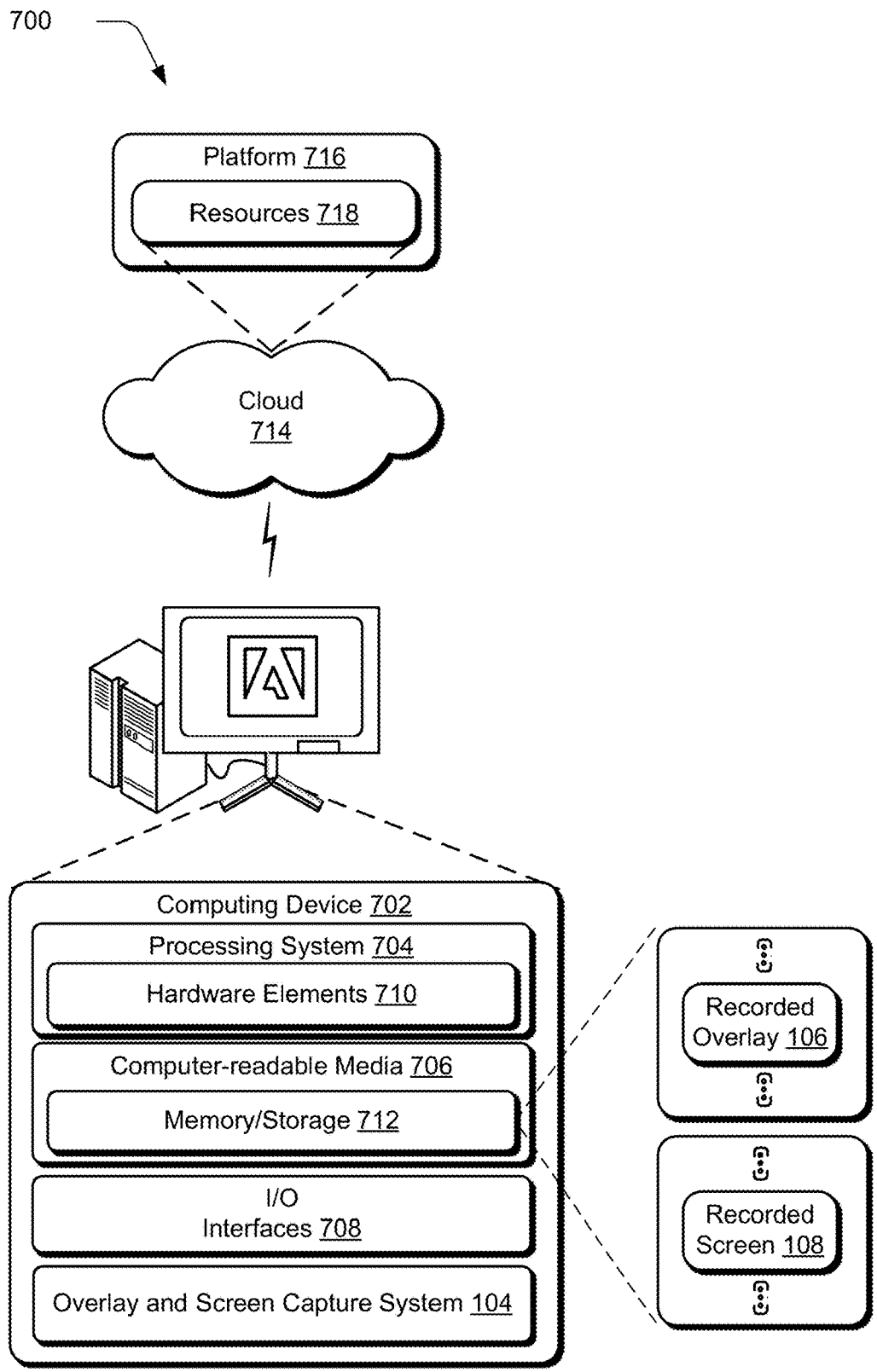
FIG. 7 illustrates an example system including various components of an example device that can be implemented as any type of computing device as described and/or utilized with reference to FIGS. 1-6 to implement the techniques described herein.

The overlay and screen capture system 104 includes multiple modules, which are representative of logic implemented at least partially in hardware, such as computer-executable instructions stored on computer-readable storage media of computing device 102 that are executable by the processing system of computing device 102, as further described in relation to FIG. 7. The overlay and screen capture system 104, for instance, may include an overlay recording module 110, a display module 112, a screen recording module 114, and a timer module 116. The individual modules of the overlay and screen capture system 104 are configured to perform their respective functionalities independent of one another, as discussed in further detail below.

The overlay recording module 110 is representative of logic implemented at least partially in hardware of the computing device 102 to record an overlay for playback, e.g., through use of a processing system, computer-readable storage media, integrated circuits, and so on as further described in relation to FIG. 7. The overlay recording module 110, for instance, may receive an overlay to be displayed as part of a screen, optionally process the at least one overlay to improve display characteristics of the at least one overlay, and record the at least one overlay for subsequent retrieval and playback, as further described in relation to FIG. 2.

Display module 112 is representative of logic implemented at least partially in hardware of the computing device 102 to paint the overlay on a screen for display in a manner that enables the overlay and screen capture system 104 to subsequently decompose the painted overlay from the screen, e.g., through use of a processing system, computer-readable storage media, integrated circuits, and so on as further described in relation to FIG. 7. As discussed herein, painting the overlay on the screen refers to blending each pixel of the overlay with a corresponding pixel of the screen to produce a mathematically weighted combination of the overlay pixel value and the screen pixel value to be used in painting the overlay onto the screen. Weights of the respective overlay and screen pixel values to use in the mathematically weighted combination of pixel values are defined by alpha values that can vary in value between 0 and 1 and represent a degree of transparency for the overlay when painted onto the screen.

Decomposing a painted overlay from a screen refers to determining original screen pixel values from the mathematically weighted combination of overlay pixel values and screen pixel values used to blend the painted overlay with the screen. Because information describing original screen pixel values for a pixel occupied by a painted overlay is preserved in the mathematically weighted combination of pixel values used in painting the overlay onto the screen, original screen pixel values can be retrieved from pixels occupied by a painted overlay. In an implementation, an original screen pixel value is determined by subtracting the weighted original overlay pixel value from the mathematically weighted combination of pixel values and dividing the resulting by the alpha value used to blend the screen and overlay pixel values. This is repeated for each screen pixel occupied by a painted overlay to determine original screen pixel values for the entire screen.

The display module 112, for instance, may receive an overlay to be painted onto a screen from the overlay recording module 110. In one or more implementations, the display module 112 is configured to apply alpha blending to the overlay to provide a level of transparency, and paint the alpha blended overlay onto a screen for display. As discussed herein, "alpha blending" refers to mathematically combining the pixel value of an overlay pixel with the pixel value of a corresponding screen pixel so that the overlay is painted onto the screen having a degree of transparency, where each pixel of the painted overlay includes information describing both the original screen pixel value and the original overlay pixel value. Thus, alpha blending an overlay generates a semi-transparent overlay that appears opaque to the human eye but enables the overlay and screen capture system to determine original screen and pixel values using the techniques described herein. In accordance with one or more implementations, the display module 112 includes a paint buffer 118. As discussed herein, the paint buffer 118 represents a portion of the computing device 102's computer-readable storage media that is configured to store one or more overlays along with any metadata associated with the one or more overlays. For instance, metadata associated with an overlay may include information describing individual pixel values for the overlay, an alpha value assigned to the overlay for painting onto the screen, and a location of the overlay relative to a screen, as further described in relation to FIG. 2.

As discussed herein, a pixel value for an overlay refers to an integer describing a color and brightness for an individual pixel in the overlay. As discussed herein, an alpha value for an overlay refers to a numerical value between zero and one describing a degree of transparency applied to the overlay by the display module 112 before the overlay is painted onto a screen. In one or more implementations, the display module 112 is configured to lock the paint buffer 118 while the display module 112 is applying alpha blending to the overlay and painting the overlay onto a screen for display. By locking the paint buffer 118, display module 112 ensures that only overlays stored in the locked paint buffer 118 are painted onto the screen and that metadata associated with overlays painted on the screen is maintained to ensure synchronous operation with screen recording module 114, as discussed in further detail below. After painting all the overlays stored in the paint buffer 118 onto a screen, the display module 112 passes the screen with painted overlays onto the screen recording module 114 and unlocks the paint buffer 118, as further described in relation to FIG. 2.

Screen recording module 114 is representative of logic implemented at least partially in hardware of the computing device 102 to decompose an overlay from a screen and record the screen independent of any overlays, e.g., through use of a processing system, computer-readable storage media, integrated circuits, and so on as further described in relation to FIG. 7. The screen recording module 114, for instance, may receive a screen with an overlay painted thereon from the display module 112. For example, the screen recording module 114 may receive, from the display module 112, an image of the screen with the overlay painted onto the screen. Thus, the screen recording module 114 receives a screenshot of the screen with one or more painted overlays from the display module 112. In one or more implementations, the screen recording module 114 is configured to decompose the overlay from the screen to generate and record a screen that does not include a display of any overlays. In one or more implementations, the screen recording module 114 is configured to decompose overlays from a screen using overlay metadata stored in the paint buffer 118. Decomposing a painted overlay from a screen refers to determining original screen pixel values from the mathematically weighted combination of overlay pixel values and screen pixel values used to blend the painted overlay with the screen. Because information describing original screen pixel values for a pixel occupied by a painted overlay is preserved in the mathematically weighted combination of pixel values used in painting the overlay onto the screen, original screen pixel values can be retrieved from pixels occupied by a painted overlay. In an implementation, overlay metadata stored in the paint buffer 118 includes information describing the original overlay pixel values for a painted overlay, the alpha value used to blend the original overlay pixel values with the original screen pixel values, and the mathematically weighted pixel value used to paint the overlay onto the screen. In this manner, the screen recording module 114 is configured to restore screen pixel values for regions of the screen otherwise visually occluded by an overlay, as further described in relation to FIG. 2.

In order to ensure that the screen recording module 114 is reading overlay metadata from the paint buffer 118 that corresponds to overlays currently displayed on the screen, the screen recording module 114 is configured to lock the paint buffer 118 until after decomposing overlays from the screen. By locking the paint buffer 118 until after overlays are decomposed from the screen, the screen recording module 114 prevents the display module 112 from placing overlays or overlay metadata into the paint buffer 118 that do not correspond to overlays currently painted on the screen during decomposition. This ensures that the screen recording module 114 will use the correct overlay metadata for decomposing overlays from the screen. After decomposing overlays from the screen, the screen recording module 114 is configured to generate a recorded screen for subsequent retrieval and playback, as further described in relation to FIG. 2.

The timer module 116 is representative of logic implemented at least partially in hardware of the computing device 102 to control operational frequency of the overlay recording module 110, the display module 112, and the screen recording module 114 of the overlay and screen capture system 104. For example, the timer module 116 may control operational frequency of the overlay and screen capture system 104's various modules through the use of a processing system, computer-readable storage media, integrated circuits, and so on as further described in relation to FIG. 7.

The timer module 116, for instance, may control a rate at which the overlay recording module 110 captures frames of an overlay in accordance with one or more implementations. For example, the timer module 116 may cause the overlay recording module 110 to capture frames of a time bar overlay at a slower rate than a rate used to capture frames of a webcam preview overlay. In this example, a display of the time bar overlay may change slower (e.g., once every second) than a display of the webcam preview overlay due to the webcam's frame rate (e.g., 24 frames per second, 30 frames per second, etc.). Thus, the timer module 116 controls a rate at which the overlay recording module 110 captures frames of an overlay, based on display characteristics of the overlay. The timer module 116 is additionally configured to control a rate at which the display module 112 places overlays into the paint buffer 118 and paints the overlays from the paint buffer 118 onto a screen. In accordance with one or more implementations, the timer module 116 causes the display module 112 to place overlays into the paint buffer 118 and paint overlays from the paint buffer 118 to a screen at a rate that is similar to the rate at which overlay recording module 110 captures frames of an overlay.

The timer module 116 is additionally configured to control a rate at which the screen recording module 114 captures a screen with painted overlays, decomposes the painted overlays from the screen, and records the screen independent of the painted overlays. Because a rate at which the screen recording module 114 may capture a screen with painted overlays, decompose the painted overlays from the screen, and record the screen independent of the painted overlays depends on whether the paint buffer 118 is locked, the timer module 116 is configured to monitor a lock status of the paint buffer 118. In accordance with one or more implementations, when the timer module 116 ascertains that the display module 112 has unlocked the paint buffer 118, the timer module 116 causes the screen recording module 114 to capture a screen with painted overlays from the display module 112 and proceed with decomposing the overlays from the screen to record the screen, independent of any overlays.

The digital medium environment 100 further depicts additional computing devices 120 and 122 that are configured to communicate with computing device 102 over a network 124, such as the Internet. For example, computing devices 120 and 122 may be connected via network 124 with computing device 102 during an online conference. In accordance with one or more implementations, computing device 102 is configured to provide one or more of the recorded overlays 106 or recorded screens 108 to enable a user of a different computing device to separately view screens and/or overlays recorded by computing device 102. Using the techniques described herein, computing device 102 is configured to provide separately recorded overlays 106 and/or screens 108, which are simultaneously displayed at computing device 102, to computing devices 120 and 122 in real time during an online conference. Alternatively or additionally, computing device 102 is configured to store the separately recorded screens 108 and overlays 106 for subsequent playback at computing device 102. The separately recorded screens 108 and overlays 106 may then be retrieved from storage and transmitted to one or more different computing devices. Although the digital medium environment 100 is illustrated as including only two different computing devices 120 and 122, digital medium environment 100 may include any number of computing devices in accordance with various implementations. Computing devices 120 and 122 may be configured as any suitable type of computing device, as described in further detail with respect to FIG. 7.

Having considered an example digital medium environment, consider now a discussion of some example details of an overlay and screen capture system in accordance with one or more implementations.

Example Overlay and Screen Capture System

Figure 2:
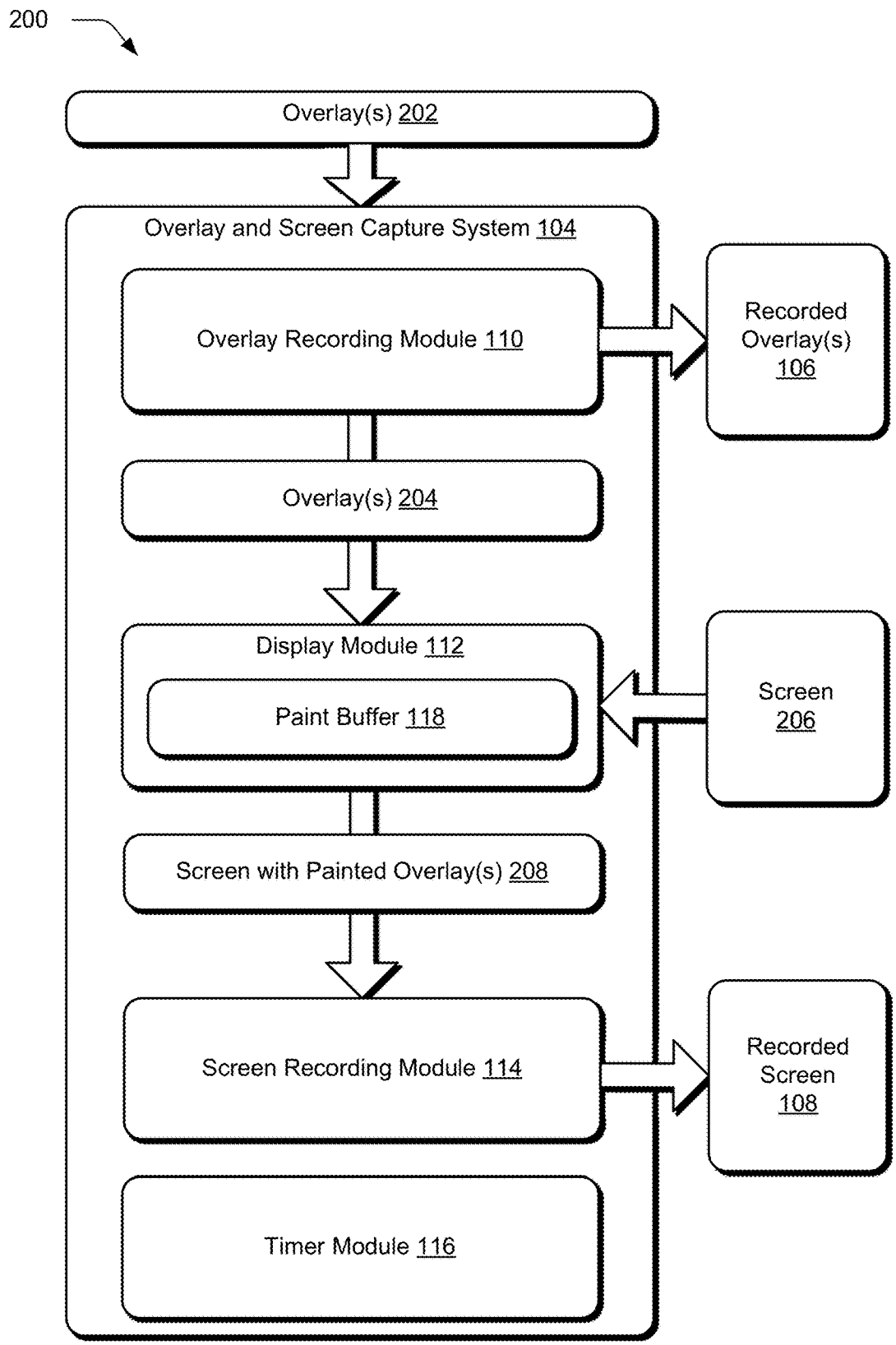
FIG. 2 depicts an example of an overlay and screen capture system implementing the techniques described herein.

FIG. 2 illustrates an example implementation scenario 200 showing the overlay and screen capture system 104 implemented as a pipeline using the overlay recording module 110, the display module 112, the screen recording module 114, and the timer module 116, as illustrated in FIG. 1. In accordance with one or more implementations, the overlay and screen capture system 104 receives an overlay 202. Although generally described as a single overlay, the overlay 202 may refer to multiple overlays in accordance with one or more implementations. The overlay 202 may be received from an application running on a computing device implementing the overlay and screen capture system 104, such as computing device 102 of FIG. 1. Alternatively or additionally, the overlay 202 may be received from a source that is remote to the computing device implementing the overlay and screen capture system 104, such as via network 124 as illustrated in FIG. 1.

The overlay 202 is received at overlay recording module 110 of the overlay and screen capture system 104. In accordance with one or more implementations, the overlay recording module 110 is configured to receive the overlay 202 by receiving a pointer to a memory location of a computing device implementing the overlay and screen capture system 104, such as computing device 102 of FIG. 1. The overlay 202 is stored as an image in the memory location of the computing device as a collection of pixel values for the overlay 202. For example, if the overlay 202 is stored as an image having 1000 pixels, the memory location of the computing device is configured to store a color value and a brightness value for each of the 1000 pixels in the image. Alternatively, the overlay 202 may be received as a pointer to a memory location of a source that is remote to the computing device implementing the overlay and screen capture system 104.

In accordance with one or more implementations, the received overlay 202 may be optionally processed by the overlay recording module 110. For example, the overlay recording module 110 is configured to process a received overlay by resizing the received overlay 202, recoloring the received overlay 202, removing a background from the received overlay 202, and so on. In this manner, the overlay recording module 110 is configured to optionally process a received overlay 202 to improve display properties of the overlay when it is painted onto a screen and when it is separately played back by a media player, as discussed in further detail below.

In response to receiving the overlay 202 and optionally processing the overlay 202, the overlay recording module 110 encodes the overlay 202 for storage and generates recorded overlay 106. The overlay recording module 110 is configured to encode the overlay 202 for storage using any suitable encoding technique. For example, the overlay recording module 110 may encode the overlay 202 for storage using the H264 codec in an MP4 container to generate the recorded overlay 106. In accordance with one or more implementations, the overlay recording module 110 encodes the overlay 202 for storage on a computing device implementing the overlay and screen capture system 104, such as computing device 102 as illustrated in FIG. 1.

In accordance with one or more implementations, a display of the received overlay 202 may change over time. For example, if the received overlay 202 comprises a webcam preview display, pixel values of the received overlay 202 may vary among different frames captured by the webcam and may vary at a rate that corresponds to a frame rate of the webcam used to generate the webcam preview. In order to account for an overlay that changes display over time, the overlay recording module 110 is configured to receive and process individual frames of the overlay 202 at a rate that is dictated by the timer module 116. In accordance with one or more implementations, the timer module 116 is configured to determine the rate at which the overlay's display changes, based on metadata associated with the overlay 202. For example, if the overlay 202 comprises a webcam preview display, metadata associated with the overlay 202 may indicate a frame rate of the webcam that was used to capture the webcam preview display. Alternatively, metadata associated with the overlay 202 may include information provided by an application that generated the overlay 202, describing a rate at which a display of the overlay 202 changes. Thus, the timer module 116 is configured to adjust a rate at which the overlay recording module 110 processes and encodes frames of the overlay 202 for storage based on a rate at which a display of the overlay 202 changes during normal display.

As discussed herein, reference is made to capturing, processing, recording, encoding, and storing overlays in the context of a single overlay. However, because an overlay's display may change as a function of time, the techniques described herein are configured to capture, process, record, encode, and store individual frames of a single overlay to preserve the overlay's display as it changes over time. The overlay recording module 110 is configured to combine multiple frames of a received overlay 202 that are individually processed and encoded for storage into a single recorded overlay 106. For example, an overlay of a webcam preview display is processed on a frame-by-frame basis by the overlay recording module to ensure that changes in display of the webcam preview display are preserved for subsequent playback. Thus, the overlay recording module treats each frame of the webcam preview display as a separate overlay. Although processed as separate overlays, because the individual frames were generated by a single overlay, the overlay recording module combines each frame of the overlay during recording to generate single recorded overlay 106 that includes each frame of the received overlay 202. In this manner, even though the overlay recording module 110 processes and encodes individual frames of an overlay 202 as though the individual frames were independent overlays, the individual frames are aggregated into a single recorded overlay 106 for convenient storage, transmission, and playback.

In accordance with one or more implementations, the overlay recording module 110 receives multiple overlays 202 for simultaneous display as part of a screen. For example, the overlay recording module 110 may receive multiple overlays 202, such as a webcam preview display of a presenting user, a teleprompter display providing a script to the presenting user, the time bar display indicating an elapsed duration of the presentation, controls for stopping and starting recording of the presentation, and so on. In this example, the timer module 116 is configured to ascertain a frame rate describing a rate of change in display for each of the multiple overlays 202. In an implementation, the timer module 116 can ascertain a frame rate describing the rate of change in display for each of the multiple overlays based on overlay metadata received along with the overlay. For example, a webcam preview overlay may be received from a webcam along with overlay metadata describing a frame rate of the webcam. Similarly, a teleprompter overlay may be received from an application that generated the teleprompter overlay along with overlay metadata including information describing a rate in change in display for the teleprompter overlay. This overlay metadata describing frame rate for each overlay may be passed to the timer module 116 when the overlay and screen capture system 104 receives the multiple overlays 202. In response to determining a frame rate for each of the multiple overlays 202, the timer module 116 uses the highest frame rate of the multiple overlays to dictate a rate at which the overlay recording module 110 captures, processes, and encodes individual frames of the multiple overlays 202 to generate multiple recorded overlays 106. In this manner, the timer module 116 ensures that an appropriate capture rate is used by the overlay recording module 110 so that the recorded overlays 106 can be played back in a manner that synchronizes playback of the recorded overlays 106 to mimic a real-time display of the overlays 202.

After generating the recorded overlay 106, the overlay recording module 110 passes overlay 204 to the display module 112. As illustrated, overlay 204 represents the overlay 202 and its associated pixel values that identify a color and brightness for each pixel in the overlay 202. If the display of overlay 202 changes over time, the overlay 204 represents a frame of the overlay 202 that is captured by the overlay recording module 110 at a frequency defined by timer module 116. In accordance with one or more implementations where the overlay recording module 110 processed the received overlay 202, overlay 204 represents the processed version of the overlay 202 along with associated overlay pixel values and metadata.

In addition to receiving overlay 204, the display module 112 is configured to receive a screen 206. The screen 206 may be received from an operating system of a computing device implementing the overlay and screen capture system 104, such as computing device 102 as illustrated in FIG. 1. For example, the screen 206 may include a user interface for the operating system of computing device 102, along with a user interface for at least one application running on the computing device 102.

When the display module 112 receives the overlay 204, the display module 112 places the overlay 204 into the paint buffer 118 and locks the paint buffer. The display module 112 then applies alpha blending to the overlay 204 in order to paint the overlay 204 onto the screen 206. As discussed herein, alpha blending refers to mathematically combining the pixel value of a pixel of overlay 204 with the pixel value of a corresponding pixel of the screen 206 so that overlay 204 is painted onto screen 206 having a degree of transparency. Weights of the respective overlay and screen pixel values to use in the mathematically weighted combination of pixel values are defined by alpha values that can vary in value between 0 and 1 and represent a degree of transparency for the overlay when painted onto the screen.

In accordance with one or more implementations, this degree of transparency is not observable by the human eye. Thus, the display module 112 is configured to paint the overlay 204 onto the screen 206 such that the pixel colors of the screen 206 that are visually occluded by the overlay 204 cannot be observed by a human eye. Although transparency of an alpha blended overlay is imperceptible to the human eye, it is sufficient to enable the screen recording module 114 to determine original screen pixel values in areas that are visually occluded by an overlay, as discussed in further detail below.

In order to paint the overlay 204 onto the screen 206, the display module 112 determines, for each pixel of overlay 204, a pixel value and a corresponding location for the pixel to be painted on the screen 206. In accordance with one or more implementations, the display module 112 determines the pixel values for the overlay 204 by accessing the memory location that stores an image representing the overlay 202 that was used to generate the overlay 204. In accordance with one or more implementations, the display module 112 is configured to determine a pixel location for a pixel of the overlay 204 using overlay metadata from the paint buffer 118. For each pixel of the overlay 204, the display module 112 additionally determines a pixel value for a pixel in the screen 206 that will be visually occluded by the pixel of overlay 204. After the display module 112 determines pixel values from the overlay 204 and from the screen 206 for each pixel location to be occupied by the overlay 204 during display, the display module 112 determines a pixel value to be used in painting the overlay 204 onto the screen 206 to generate a screen with painted overlay(s) 208.

In one or more implementations, the display module 112 determines a pixel value $c_0$ to use for painting an overlay onto the screen to generate the screen with painted overlay(s) 208 that is defined as:

$$c_0 = \alpha c_1 + (1-\alpha)c_2 \qquad \text{(Eq. 1)}$$

where $c_1$ represents the pixel value of the screen 206 and $c_2$ represents the pixel value of the overlay 204, for a given pixel location. The alpha value $\alpha$ represents a constant numerical value corresponding to a transparency value for the alpha channel assigned to the overlay 204, where $0 < \alpha < 1$. As evidenced from Equation 1, an alpha value of zero would result in a pixel of an overlay painted onto a screen having the same value as $c_2$. Thus, using an alpha value of zero results in a transparent overlay, where the painted overlay would only display pixels of the underlying screen. Conversely, an alpha value of one would result in a pixel of an overlay painted onto a screen having the same value as $c_1$, and would thus generate an entirely opaque overlay that prevents retrieval of any original screen pixel values overlapped by the opaque overlay. As such, the alpha value used by display module 112 is inversely proportional to an amount of transparency used in painting overlay 204 onto screen 206.

In accordance with one or more implementations, display module 112 uses an alpha value of $0.5 < \alpha < 0.7$ for painting the overlay 204 onto the screen 206. Using Equation 1, the display module 112 determines a pixel value $c_0$ for each pixel in the overlay 204. In accordance with one or more implementations, the alpha value used by display module 112 is selectable by a user of the computing device implementing the overlay and screen capture system 104, such as computing device 102 as illustrated in FIG. 1. In accordance with one or more implementations, where overlays 204 include multiple overlays to be simultaneously painted onto the screen 206, the display module 112 uses a common alpha value for blending each of the multiple overlays onto the screen. Alternatively, the display module 112 may use different alpha values for blending different ones of the multiple overlays onto the screen.

The display module 112 then generates a screen with painted overlay(s) 208, using the pixel values $c_0$ instead of $c_2$, so that the screen recording module 114 can generate a recorded screen 108 that is displayed without any overlays, as discussed in further detail below.

The rate at which display module 112 generates the screen with painted overlay(s) 208 may be controlled by the timer module 116. In accordance with one or more implementations, the timer module 116 causes the display module 112 to generate the screen with painted overlay(s) 208 at a rate that is equal to or faster than the rate that was used by the overlay recording module 110 to generate the overlay 204. In this manner, the timer module 116 ensures that the display module 112 functions synchronously with the overlay recording module 110, even though the various modules of the overlay and screen capture system 104 are configured to perform their respective functionalities independent of one another.

After generating the screen with painted overlay(s) 208, the display module 112 temporarily unlocks the paint buffer 118 and stores additional information in the paint buffer describing the one or more alpha values used to generate the screen with painted overlay(s) 208. The display module 112 then passes the screen with painted overlay(s) 208 to the screen recording module 114, enabling the screen recording module to generate a recorded screen 108, independent of the overlays previously painted thereon. The display module 112 additionally enables the screen recording module 114 to read from the temporarily unlocked paint buffer 118 and re-lock the paint buffer. This enables the screen recording module 114 to ascertain, from the paint buffer 118, alpha values that were used to generate the screen with painted overlay(s) 208 as well as original pixel values for the one or more overlays 204 that are painted on the screen with painted overlay(s) 208.

Upon receiving the screen with painted overlay(s) 208, the screen recording module 114 locks the paint buffer 118 that was temporarily unlocked by the display module 112. By locking the paint buffer 118, the screen recording module 114 ensures that the display module 112 does not alter information pertaining to an overlay included in the screen with painted overlay(s) 208. For example, because the various modules of the overlay and screen capture system 104 are configured to function independent of one another, the display module 112 may inadvertently add information corresponding to a subsequent frame of an overlay or information corresponding to a different overlay while the paint buffer 118 is unlocked. In this example, the screen recording module 114 may inadvertently read information from the paint buffer 118 that does not correspond to an overlay on the screen with painted overlay(s) 208 being decomposed. Thus, display module 112 enables the screen recording module 114 to lock the paint buffer 118 while generating the recorded screen 108 to ensure that the screen recording module 114 considers only information pertaining to overlays that are presently painted onto the screen with painted overlay(s) 208.

The screen recording module 114 generates a recorded screen 108 from the screen with painted overlay(s) 208 by decomposing overlays from the screen with painted overlay(s) 208 to determine and restore original pixel values of screen 206 that were otherwise visually occluded by the overlays. The screen recording module 114 is configured to restore these original pixel values of the screen 206 using overlay metadata stored in the paint buffer 118. In accordance with one or more implementations, the screen recording module 114 determines, for each overlay of the screen with painted overlay(s) 208, pixel location information for the overlay, an alpha value $\alpha$ associated with the overlay, and original pixel values $c_2$ for each pixel of the overlay. Using this information, the screen recording module 114 determines pixel values $c_0$ for each pixel location in the screen with painted overlay(s) 208 that corresponds to an area where an overlay is displayed. This enables the screen recording module 114 to determine an original screen pixel value $c_1$ for each pixel of the screen with painted overlay(s) 208 that includes at least a portion of an overlay. In accordance with one or more implementations, the pixel value $c_1$ is defined as:

$$c_1 = \frac{c_0 - (1-\alpha)c_2}{\alpha} \qquad \text{(Eq. 2)}$$

Using Equation 2, the screen recording module 114 determines pixel values $c_1$ for each pixel in the screen with painted overlay(s) 208 that includes at least a portion of an overlay. The screen recording module 114 then replaces pixel values for each pixel in the screen with painted overlay(s) 208 occupied by a displayed overlay with a determined $c_1$ pixel value to generate a recorded screen 108. Thus, the screen recording module 114 is configured to generate recorded screen 108, having identical pixel values to the original pixel values of screen 206, which existed before the display module 112 painted the one or more overlays onto the screen.

In response to determining original pixel values of the screen 206, the screen recording module 114 generates recorded screen 108. In accordance with one or more implementations, the screen recording module 114 encodes the recorded screen 108 for storage on a computing device implementing the overlay and screen capture system 104, such as computing device 102 of FIG. 1. In accordance with one or more implementations, a rate at which the screen recording module 114 generates the recorded screen 108 is controlled by the timer module 116. For example, the timer module 116 may cause the screen recording module 114 to generate the recorded screen 108 at a rate that is equal to or faster than the rate that was used by the overlay recording module 110 to generate the overlay 204. In this manner, the timer module 116 ensures that the screen recording module 114 functions synchronously with both the display module and the overlay recording module 110, even though these different modules are configured to perform their respective functionalities independent of one another.

After generating the recorded screen 108, the screen recording module 114 unlocks the paint buffer 118 and causes the display module 112 to clear the contents of the paint buffer. This enables the display module 112 to continue processing subsequent overlays 204 as received from the overlay recording module 110. The overlay and screen capture system 104 is configured to continue performing the steps of the pipeline illustrated in implementation scenario 200 for any duration of time to record a screen and account for changing overlay displays on the screen. As such, the overlay and screen capture system 104 is configured to blend overlays onto a screen while generating separate recorded overlays 106 and recorded screens 108 without any loss of content displayed by either an overlay or a screen.

Having considered an example overlay and screen capture system in accordance with one or more implementations, consider now example illustrations of screens and overlays implemented in a digital medium environment.

Example Screens and Overlays

Figure 3:
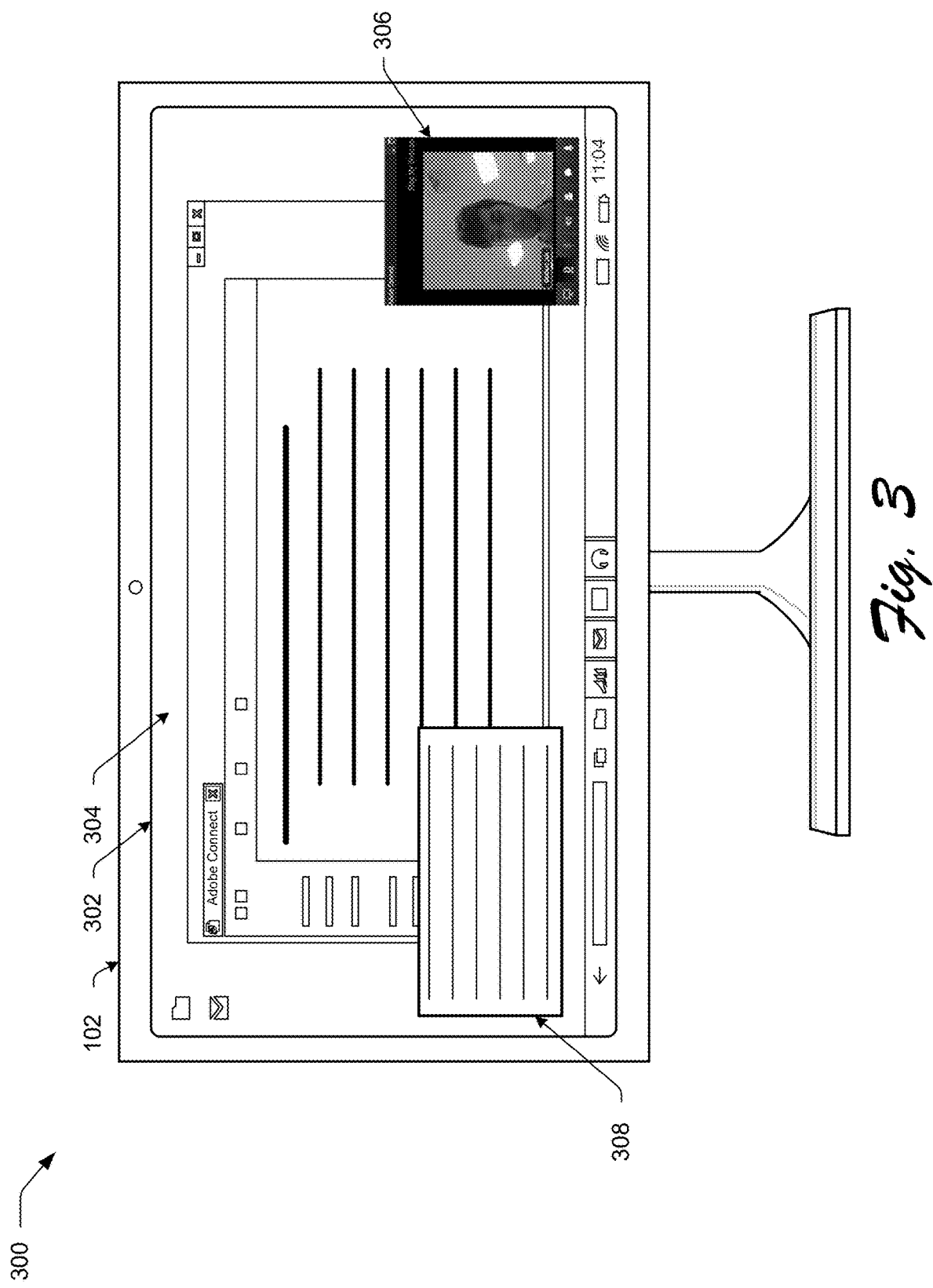
FIG. 3 depicts an example of a screen with overlays in accordance with one or more implementations.

FIG. 3 illustrates an example 300 of a screen with overlays in accordance with one or more implementations. In the illustrated example 300, a computing device 102 includes a display area 302 configured to display a screen 304. Although illustrated as occupying the entire display area 302, the screen 304 may occupy only a portion of the display area 302 in accordance with one or more implementations. The screen 304 is illustrated as displaying a user interface for an operating system of the computing device 102 along with one or more additional user interfaces or displays of content. As discussed herein, a user interface may be generated by an operating system, an application, a web service, and the like. Displayed content may include various combinations of video, audio, multi-media streams, games, animations, images, web documents, web pages, applications, device applications, and the like.

In the illustrated example 300, the screen 304 additionally includes a display of overlays 306 and 308 that have been painted onto the screen 304 using the techniques described herein. As illustrated, overlay 306 comprises a webcam preview of a user of the computing device 102 along with one or more controls. The one or more controls of overlay 306 comprise controls that are configured to control operation of a webcam, start recording of the screen 304, stop recording of the screen 304, control display of one or more additional overlays, control a display of an existing overlay, and so on. Although illustrated as part of overlay 306, individual ones of the one or more controls may be implemented and displayed as separate overlays on screen 304. In accordance with one or more implementations, the one or more controls may be used to control a display of other overlays displayed on the screen 304, such as overlay 308. In the illustrated example, overlay 308 is a teleprompter overlay that is configured to display a script to a user of the computing device 102. Although example 300 only illustrates two overlays 306 and 308 displayed on the screen 304, additional or fewer overlays may be displayed on the screen at a given time in accordance with one or more implementations. For example, additional overlays may include a time bar overlay that displays an elapsed recording time associated with recording the screen 304.

Alternatively or additionally, an overlay can include a display of content that is generated by an application that is running on computing device 102 but does not currently have a displayed user interface on the screen 304. For example, an overlay may include a notification generated by an email application that is out of focus or running as a background process, and thus does not have a displayed user interface on the screen 304. As such, any user interface or displayed content that visually occludes the screen 304 and that is not intended to be recorded with the screen is regarded as an overlay and decomposed from the screen using the techniques described herein.

Having considered an example screen with overlays in accordance with one or more implementations, consider now an example of a screen with portions that are visually obscured by overlays.

Figure 4:
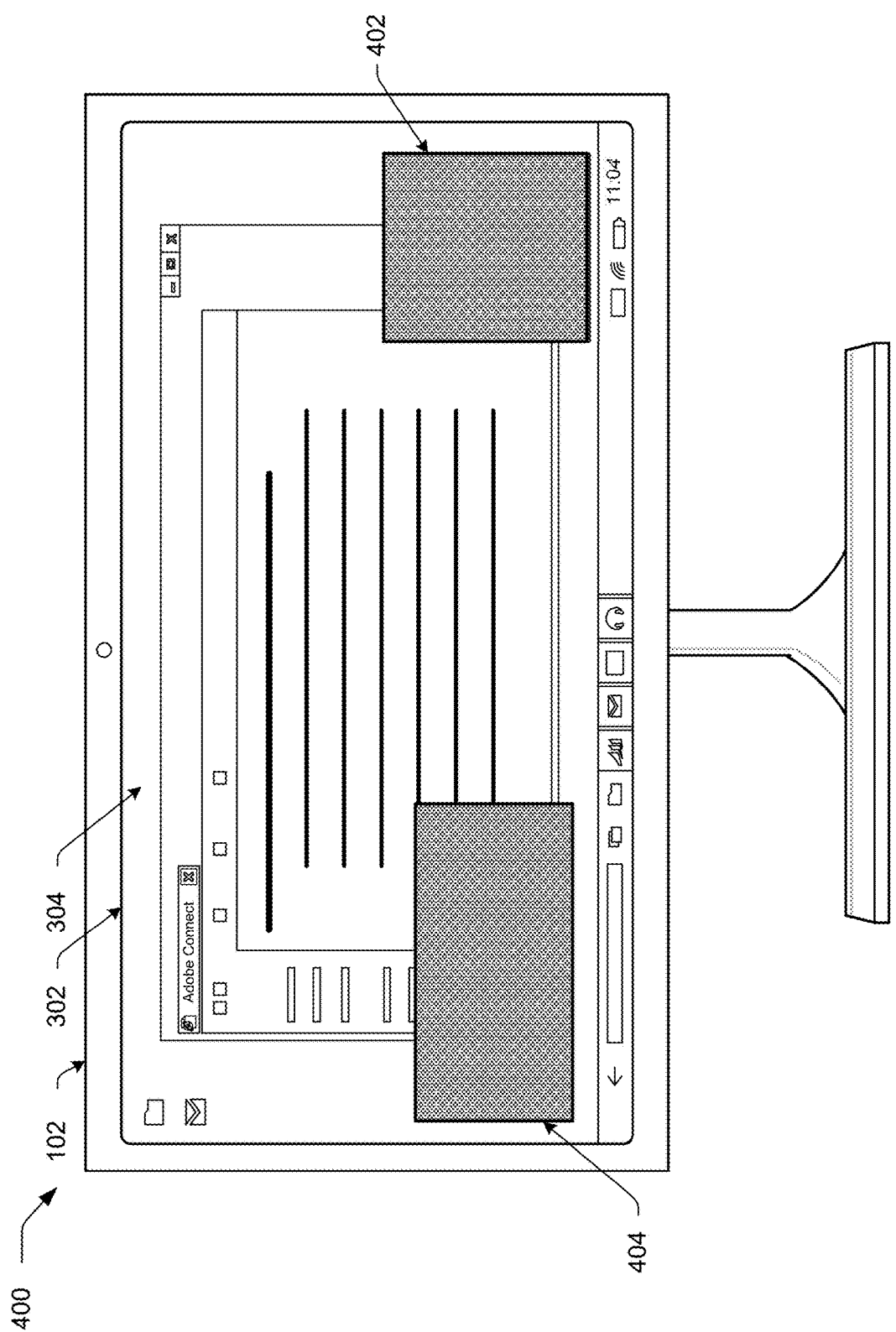
FIG. 4 depicts an example of a screen with portions that are visually obscured by overlays in accordance with one or more implementations.

FIG. 4 illustrates an example 400 of a screen with portions that are visually obscured by overlays in accordance with one or more implementations. In the illustrated example 400, a computing device 102 includes a display area 302 configured to display a screen 304. The screen 304 includes areas 402 and 404 that are visually obscured by displayed overlays, such as the overlays 306 and 308 illustrated in FIG. 3. In the illustrated example, content of the screen 304 displayed in areas 402 and 404 cannot be viewed by a user of the computing device 102 without decomposing the overlays from the screen 304, using the techniques described herein. Thus, example 400 illustrates how overlay content displayed during a recording of screen 304 can visually occlude content displayed on the screen 304 that a user of computing device 102 wishes to record.

Having considered an example screen with overlays that visually obscure portions of the screen in accordance with one or more implementations, consider now an example of a recorded screen and recorded overlays generated using the techniques described herein.

Figure 5:
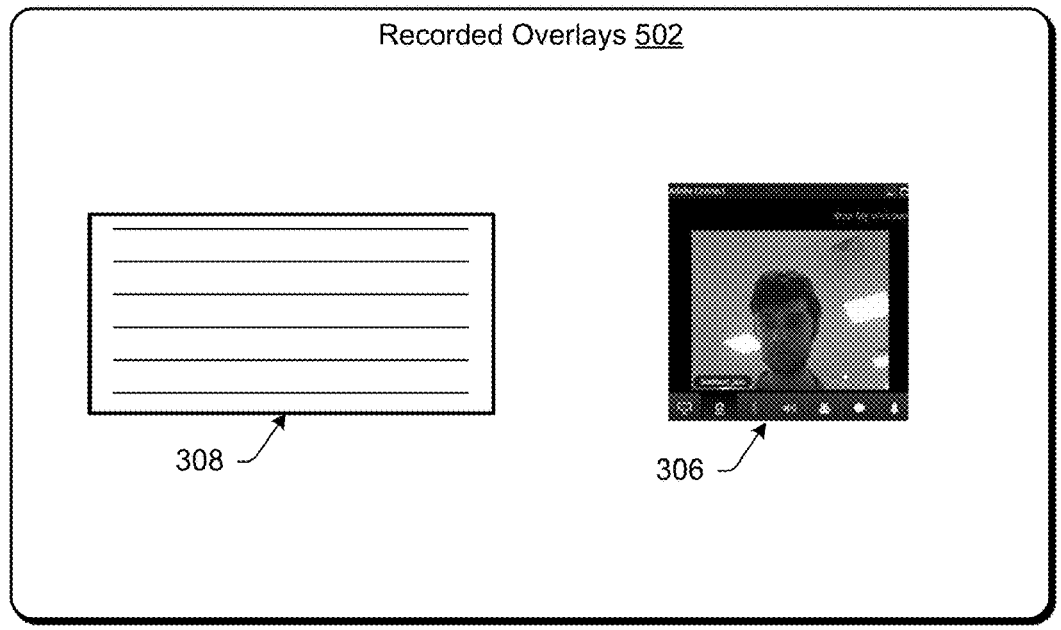
FIG. 5 depicts an example of overlays and a screen that are recorded separately in accordance with one or more implementations.
Figure 5:
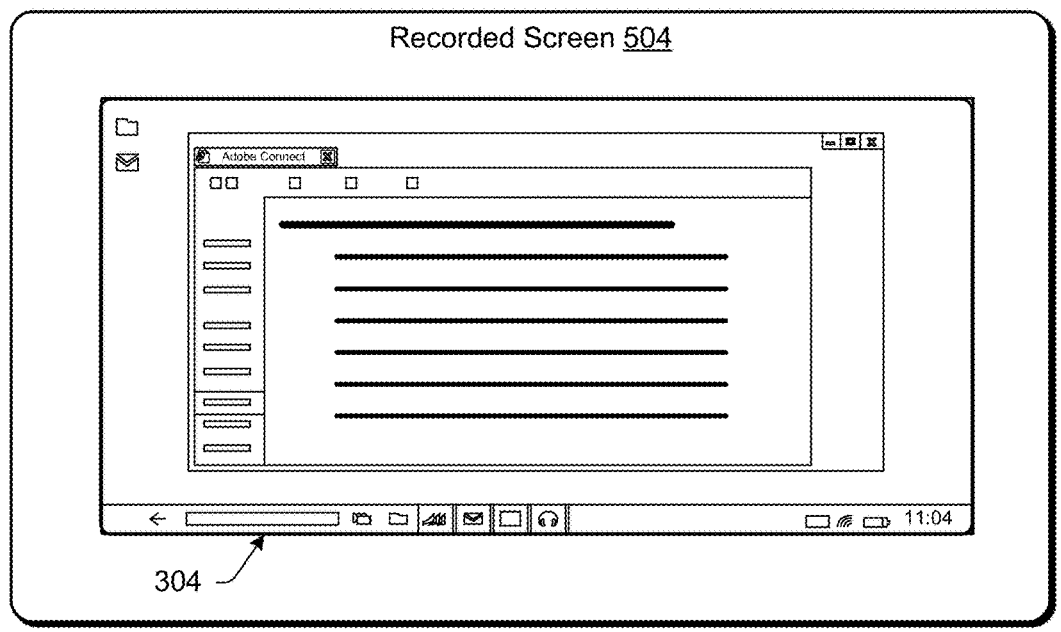

FIG. 5 illustrates an example 500 of recorded overlays and a recorded screen generated by decomposing the overlays from the screen. In the illustrated example 500, the recorded overlays 502 include overlays 306 and 308 that were simultaneously displayed on screen 304, as illustrated in FIG. 3. The recorded screen 504 includes a display of screen 304 without any overlays that visually occluded one or more portions of the screen. For instance, the recorded screen 504 includes a recording of screen 304's display, independent of a display of overlays 306 and 308 that were simultaneously displayed on the screen 304, as illustrated in FIG. 3. As illustrated in example 500, recorded screen 504 represents a display of screen 304, including a display of content that was otherwise visually occluded by overlays 306 and 308, such as areas 402 and 404 of the screen 304, as illustrated in FIG. 4. The recorded screen 504 is generated by decomposing the overlays 306 and 308 from the screen 304 to determine original pixel values of the screen that were visually occluded by the overlays. In accordance with one or more implementations, generating the recorded overlays 502 and the recorded screen 504 is performed by a computing device that displays the screen 304 and overlays 306 and 308, such as computing device 102 of FIG. 1.

Example Procedure

Figure 6:
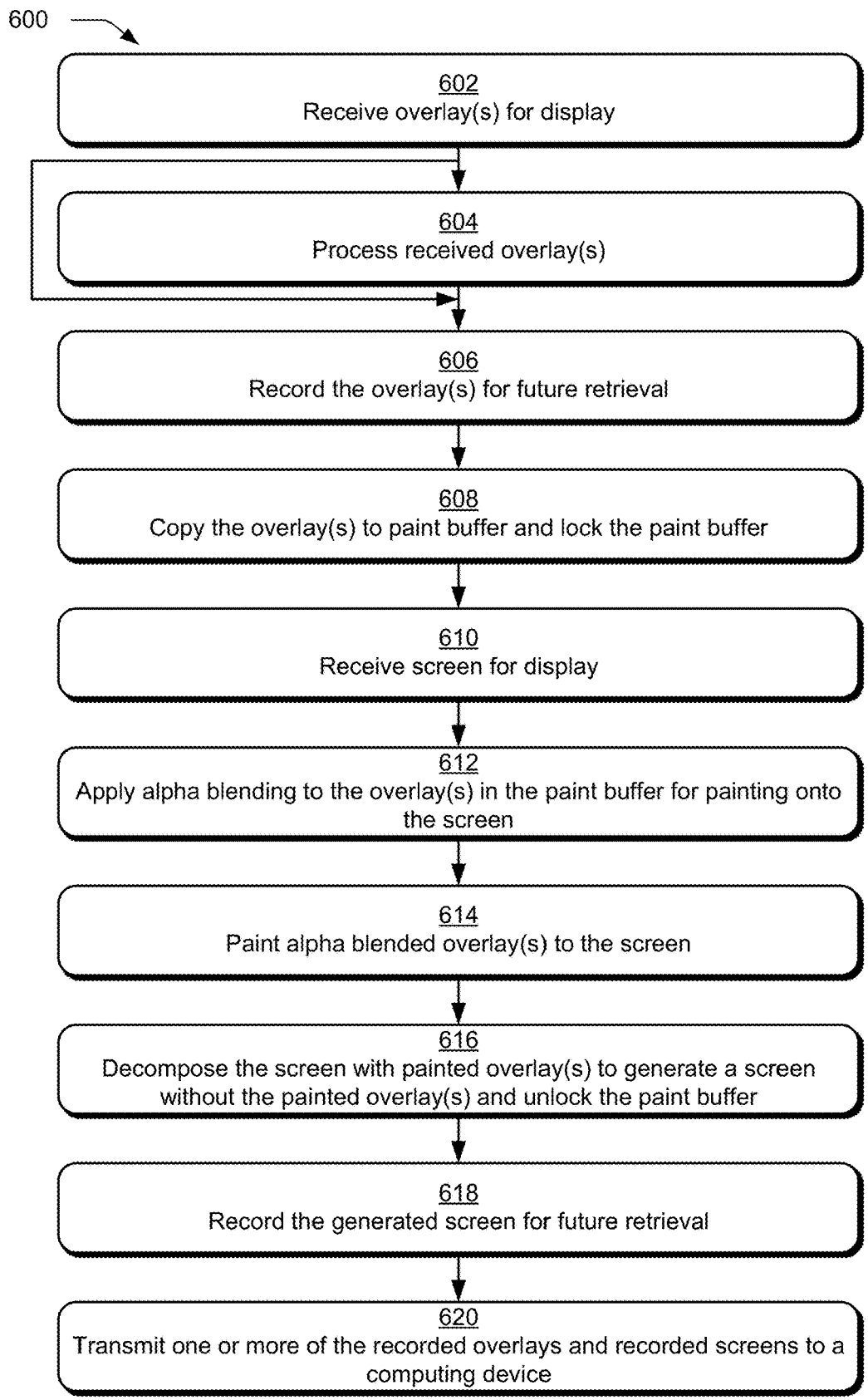
FIG. 6 is a flow diagram depicting a procedure in accordance with one or more implementations.

FIG. 6 illustrates an example procedure 600 for generating and recording at least one overlay and a screen in accordance with one or more implementations described herein. Aspects of the procedure may be implemented in hardware, firmware, or software, or a combination thereof. The procedure is shown as a set of blocks that specify operations performed by one or more devices and are not necessarily limited to the order shown for performing the operations by the respective blocks. In at least some implementations, the procedure may be performed in a digital medium environment by a suitably configured device, such as the example computing device 102 of FIG. 1 that makes use of the overlay and screen capture system 104, as described above.

At least one overlay is received for display (block 602). In accordance with one or more implementations, the overlay is received by a computing device, such as computing device 102 of FIG. 1. The overlay may be received from an application running on the computing device, or may be received from a remote source via network, such as network 124 of FIG. 1.

The overlay is then optionally processed (block 604), as indicated by the arrow circumventing block 604. In accordance with one or more implementations, a received overlay is processed by resizing the received overlay, recoloring the received overlay, removing a background from the received overlay, and the like.

After the overlay is received and optionally processed, the overlay is recorded for future retrieval (block 606). In accordance with one or more implementations, recording an overlay for future retrieval includes encoding information describing the overlay into a particular form for efficient transmission and storage of the overlay.

The overlay is then copied to a paint buffer and the paint buffer is locked (block 608). When an overlay is copied to the paint buffer, metadata associated with the overlay is also copied to the paint buffer. Overlay metadata includes location information describing a screen location for the overlay to be displayed as part of the screen. In accordance with one or more implementations, the paint buffer comprises a temporary storage location on a computing device, such as computing device 102 of FIG. 1. Locking the paint buffer prevents additional overlays or overlay metadata from being added to the paint buffer, and prevents modification or deletion of any overlays and associated overlay metadata in the paint buffer. Thus, at any given time, a locked paint buffer includes only overlays that are configured for simultaneous display as part of a screen, along with metadata associated with the overlays. In accordance with one or more implementations, copying the overlay to the paint buffer and locking the paint buffer may be performed concurrently with recording the overlay for future retrieval. Alternatively, copying the overlay to the paint buffer and locking the paint buffer may be performed subsequent to recording the overlay for future retrieval.

A screen is then received for display (block 610). In accordance with one or more implementations, the screen may be received for display at a computing device, such as computing device 102 of FIG. 1. The screen may be received for display while the overlay is copied to the paint buffer. Alternatively, the screen may be received for display before the overlay is copied to the paint buffer, or may be received for display after the paint buffer is locked. In accordance with one or more implementations, the screen is received from an operating system of the computing device. The screen may include a display of a user interface for the operating system of the computing device, a display of a user interface for one or more applications, a display of digital content, or combinations thereof.

After the screen and the overlay are received, alpha blending is applied to the overlay in the paint buffer for painting onto the screen (block 612). In accordance with one or more implementations, applying alpha blending to an overlay comprises adding an alpha channel to the overlay that blends a pixel value of the overlay with a pixel value of the screen for a given pixel location to provide a degree of transparency to the overlay. This degree of transparency may be imperceptible to the human eye but discernable by a computing device, such as the computing device 102 of FIG. 1. Thus, alpha blending an overlay generates a semi-transparent overlay that appears opaque to the human eye. In accordance with one or more implementations, a computing device is configured to alpha blend an overlay using pixel value information stored as overlay metadata in the paint buffer. In an implementation where multiple overlays are to be simultaneously painted onto the screen, a common alpha value is used for alpha blending the multiple overlays. Alternatively, different alpha values may be used for alpha blending different ones of the multiple overlays. Information describing the one or more alpha values used to blend overlays onto the screen are stored in the paint buffer as overlay metadata for later use in decomposing the overlays from the screen.

After the overlay in the paint buffer is alpha blended, the alpha blended overlay is painted onto the screen (block 614). In accordance with one or more implementations, an overlay is painted onto a location of the screen that is defined by location information associated with the overlay. For example, location information associated with an overlay may be included in overlay metadata and stored in the paint buffer.

The screen with painted overlays is then decomposed to generate a screen without the painted overlays (block 616). Decomposing painted overlays from a screen is performed by ascertaining a pixel value for each pixel of a painted overlay, an original pixel value for each pixel of the painted overlay, and an alpha value used to blend the painted overlay with the screen. As discussed herein, the original pixel value for each pixel of the painted overlay corresponds to a pixel value of the overlay before alpha blending was applied to the overlay. In accordance with one or more implementations, the pixel values of the painted overlay, the original pixel values of the painted overlay, and the alpha value used to blend the painted overlay can be obtained from information stored in the paint buffer. After obtaining this information, the original screen pixel values can be computed to determine an original pixel value for each pixel of the screen that was visually occluded by the painted overlay. These pixel values are used to generate a screen that displays content otherwise visually occluded by a painted overlay. After the one or more overlays have been decomposed from the screen, the paint buffer is unlocked and cleared of all stored information.

The generated screen is then recorded for future retrieval (block 618). In accordance with one or more implementations, recording a screen for future retrieval includes encoding information describing the screen into a particular form for efficient transmission and storage of the screen. Encoding information describing the screen may be performed by any suitable encoding technique. For example, the screen may be encoded using the H264 codec in an MP4 container.

The recorded overlay and/or recorded screen are then transmitted to a computing device for display (block 620). In accordance with one or more implementations, transmitting a recorded overlay and recorded screen to a computing device comprises outputting the recorded overlay and recorded screen for display at the computing device that was used to generate the recorded overlay and the recorded screen, such as computing device 102 of FIG. 1. Alternatively or additionally, transmitting a recorded overlay and recorded screen to a computing device comprises sending the recorded overlay and recorded screen to a computing device that is different from the computing device used to generate the recorded screen and recorded overlay, such as one or more of computing devices 120 and 122, as illustrated in FIG. 1. Transmitting the recorded screen and recorded overlay to one or more of computing devices 120 and 122 may be accomplished by sending the recorded screen and recorded overlay via a network, such as network 124 of FIG. 1. This enables a user of a computing device to separately view one or both of overlays and a screen that were simultaneously displayed without any pixel of the screen being visually occluded by an overlay. In accordance with one or more implementations, the transmission of the recorded screen and recorded overlay to one or more different computing devices 120 and 122 is performed in real-time with the display of the screen with recorded overlays on computing device 102. For example, the recorded screen and recorded overlay may be transmitted to one or more different computing devices 120 and 122 over network 124 to facilitate a live online conference, where users of each computing device are able to view content of the recorded screen without visual occlusion by one or more recorded overlays. In this example, only the recorded screen may be transmitted to different computing devices 120 and 122, while the display of the recorded overlays is limited to a computing device that generated the recorded overlays, such as computing device 102 of FIG. 1.

Having considered an example procedure in accordance with one or more implementations, consider now an example system and device that can be utilized to practice the inventive principles described herein.

Example System and Device

FIG. 7 illustrates an example system generally at 700 that includes an example computing device 702 that is representative of one or more computing systems and/or devices that may implement the various techniques described herein. This is illustrated through inclusion of the overlay and screen capture system 104. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). In accordance with one or more implementations, the memory/storage component 712 is configured to store at least one recorded overlay 106 and at least one recorded screen 108. The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. A method for screen recording, comprising:
receiving, by a computing device, an overlay for display at a display device of the computing device, the overlay comprising a display of content that visually occludes at least a portion of other content displayed by the display device and is not intended to be recorded with the other content;
generating, by the computing device, an alpha blended overlay that includes alpha blended pixel values instead of original pixel values for the overlay by applying alpha blending to the overlay and providing the overlay with a degree of transparency;
generating, by the computing device, a screen for display by the display device by painting the alpha blended overlay onto the other content using the alpha blended pixel values; and communicating, by the computing device, to a different computing device:
  the screen including the alpha blended overlay, without communicating information describing original pixel values for the overlay or original pixel values for the portion of other content visually occluded by the overlay; and
  an alpha value used to generate the alpha blended overlay, the alpha value enabling the different computing device to decompose the alpha blended overlay from the screen and record the other content without the alpha blended overlay.

2. The method of claim 1, further comprising processing, by the computing device, the overlay by at least one of resizing the overlay, recoloring the overlay, or removing a background from the overlay.

3. The method of claim 1, further comprising transmitting, by the computing device, the screen without the painted overlay to a different computing device for playback at the different computing device.

4. The method of claim 1, wherein the other content comprises a display of a user interface for an operating system of the computing device and a user interface of at least one application running on the computing device.

5. The method of claim 1, wherein the overlay comprises a display of a webcam preview of a user of the computing device, a teleprompter display, a control for recording the other content, or a display of a notification generated by an application running on the computing device.

6. The method of claim 1, wherein applying alpha blending to the overlay comprises blending a pixel value of the overlay with a pixel value of the other content to create a blended pixel value for the overlay that the computing device uses to generate the screen.

7. The method of claim 1, wherein the overlay comprises a plurality of frames and the computing device is configured to perform said applying alpha blending to the overlay, said generating the screen, and said communicating for each of the plurality of frames of the overlay to account for different displays among the plurality of frames.

8. The method of claim 1, wherein a rate at which the screen is generated is dependent on display characteristics of the overlay.

9. The method of claim 1, wherein said applying alpha blending comprises:
  copying the overlay to a paint buffer of the computing device after recording the overlay in storage of the computing device;
  storing information in the paint buffer describing pixel values for the overlay and location information for a display of the overlay relative to the other content;
  determining pixel values for pixels of the other content based on the location information stored in the paint buffer; and
  using the stored information in the paint buffer and the determined pixel values for pixels of the other content to apply alpha blending to the overlay.

10. A system for screen recording, comprising:
  at least one processor; and
  a computer readable storage medium having instructions stored thereon that are executable by the at least one processor to perform operations comprising:
  receiving an overlay for display at a computing device, the overlay comprising a display of content that visually occludes at least a portion of other content displayed by the computing device and is not intended to be recorded with the other content;
  generating an alpha blended overlay that includes alpha blended pixel values instead of original pixel values for the overlay by applying alpha blending to the overlay and providing the overlay with a degree of transparency;
  generating a screen for display by the computing device by painting the alpha blended overlay onto the other content using the alpha blended pixel values; and
  communicating, to the computing device:
  the screen including the alpha blended overlay, without communicating information describing original pixel values for the overlay or original pixel values for the portion of other content visually occluded by the overlay; and
  an alpha value used to generate the alpha blended overlay, the alpha value enabling the computing device to decompose the alpha blended overlay from the screen and record the other content without the alpha blended overlay.

11. The system of claim 10, wherein said applying alpha blending comprises:
  copying the overlay to a paint buffer of the computing device after recording the overlay in storage of the computing device;
  storing information in the paint buffer describing pixel values for the overlay and location information for a display of the overlay relative to the other content;
  determining pixel values for pixels of the other content based on the location information stored in the paint buffer; and
  using the stored information in the paint buffer and the determined pixel values for pixels of the other content to apply alpha blending to the overlay.

12. The system of claim 10, wherein a rate at which the screen is generated is dependent on display characteristics of the overlay.

13. The system of claim 10, the operations further comprising processing the overlay by at least one of resizing the overlay, recoloring the overlay, or removing a background from the overlay.

14. A method for screen recording, comprising:
  receiving, by a computing device, a screen with at least one painted overlay for display at a display device of the computing device, the at least one painted overlay comprising a display of content that visually occludes at least a portion of the screen and is not intended to be recorded with the screen, said receiving being performed without receiving information describing original pixel values for the overlay or original pixel values for the portion of other content visually occluded by the overlay;
  determining, by the computing device, an alpha value used to blend the at least one painted overlay with the screen;
  determining, by the computing device, for each pixel of the screen visually occluded by the at least one painted overlay, a pixel value of the at least one painted overlay as blended with the screen,
  decomposing, by the computing device, the at least one painted overlay from the screen by determining, for each pixel of the screen visually occluded by the at least one painted overlay, an original pixel value of the screen using the alpha value and the pixel value of the at least one painted overlay as blended with the screen; and recording, by the computing device, the screen without the at least one painted overlay in storage of the computing device using the original pixel values of the screen.

15. The method of claim 14, wherein the alpha value and the pixel values of the at least one painted overlay as blended with the screen are included in metadata of the screen with the at least one painted overlay.

16. The method of claim 14, wherein the screen comprises a display of a user interface for an operating system of the computing device and a user interface of at least one application running on the computing device.

17. The method of claim 14, wherein the at least one painted overlay comprises a display of a webcam preview of a user of the computing device, a teleprompter display, a control for recording the screen, or a display of a notification generated by an application running on the computing device.

18. The method of claim 14, wherein the at least one painted overlay comprises a plurality of frames and the computing device is configured to perform the determining the pixel values of the at least one painted overlay as blended with the screen, the decomposing, and the recording for each of the plurality of frames of the at least one painted overlay to account for different displays among the plurality of frames.

19. The method of claim 14, wherein the at least one painted overlay is displayed on the screen with a degree of transparency that is indiscernible to a human eye.

20. The method of claim 14, the decomposing the at least one painted overlay from the screen being performed independent of information describing original pixel values for the at least one painted overlay and independent of information describing original pixel values for the portion of the screen visually occluded by the at least one painted overlay.

* * * * *